P. B. DELANY.
Telegraph Relay.
No. 165,157.  Patented July 6, 1875.
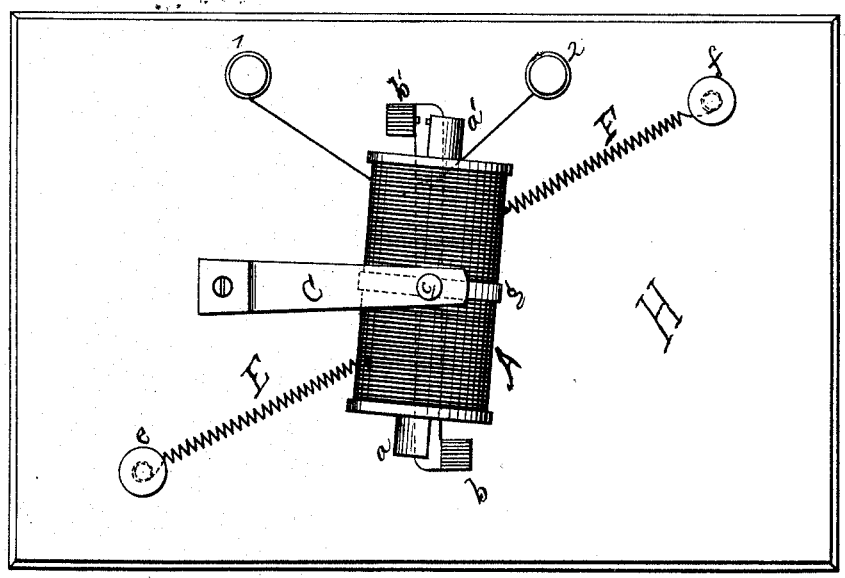
FIG. I.
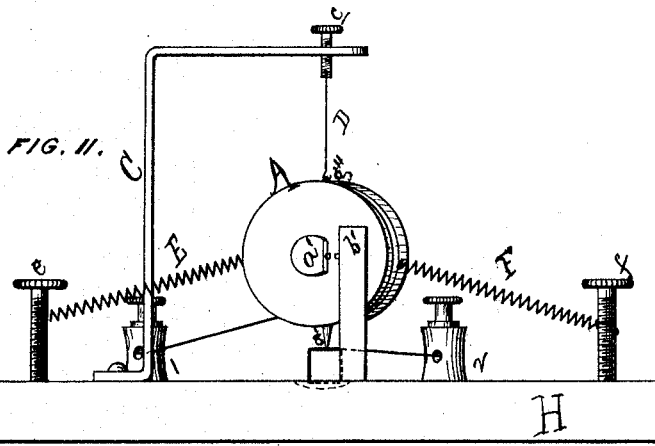
FIG. II.
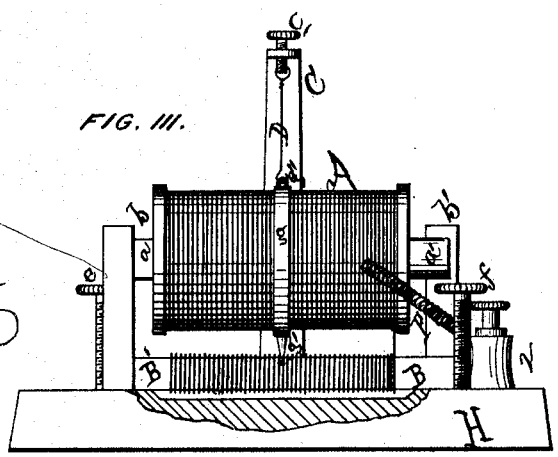
FIG. III.
WITNESSES:
INVENTOR:
Patrick B. Delany
by Fred W. Royce
Attorney

UNITED STATES PATENT OFFICE.

PATRICK B. DELANY, OF JERSEY CITY, NEW JERSEY.

IMPROVEMENT IN TELEGRAPH-RELAYS.

Specification forming part of Letters Patent No. 165,157, dated July 6, 1875; application filed December 11, 1874.

*To all whom it may concern:*

Be it known that I, PATRICK B. DELANY, of Jersey City, State of New Jersey, have invented certain new and useful Improvements in Electro-Magnets, more especially adapted for use as telegraphic relays, sounders, &c.

The object of this invention is to furnish an electro-magnet which shall operate rapidly and with the least possible amount of frictional resistance. To this end it consists in suspending a movable electro-magnetic coil by a thread or wire over a fixed armature, the armature or core of the magnet being provided with rectangular extensions, so that the armature and core may be brought into juxtaposition, as is more particularly hereinafter set out and claimed.

In order that those skilled in the art may be enabled the better to understand and to construct and use my invention, I will describe the same in detail, reference being had to the accompanying drawings forming part of this specification, in which—

Figure 1 is a plan view, Fig. 2 an end view, and Fig. 3 a side view, of a relay embodying my invention.

Like letters refer to similar parts in all the figures.

H is a base of any suitable material. Upon this I securely fasten a bar or rod of iron, B, having its ends $b$ $b'$ bent outwardly and then upwardly at right angles, as shown in the drawings. A is an electro-magnetic coil, having extended poles $a$ $a'$, preferably flattened on opposite sides, as shown. Around this coil is fitted a hoop, $g$, having on one side an extension, $g'$, forming a pivot, and upon the other a hook, $g''$. This coil is suspended by a cord, or wire, or thread, D, secured in hook $g''$, from a screw, $c$, of a bent arm, C, which is attached to the base H, and which, after rising to a suitable height, bends at right angles toward the armature-bar B, so that the screw $c$ is over the center of B. A lower bearing is formed by the pivot $g'$ taking into a suitably-formed bearing in armature B.

The armature B may be a plain piece of iron, but, by preference, I wind it, as shown in the drawings, with a continuation of the wire of the electro-magnet coil A, or so that both are in the same circuit, and so that when both are magnetized the adjacent ends of A and B shall be of opposite polarities.

Normally the coil A is swung away from the upright parts $b$ $b'$ of the armature by either one or both (as may be desired) of two springs, E F, attached to the magnet at one end, and at the other to screws $e$ $f$. 1 and 2 are the binding-posts for connecting the line or any other circuit to the magnet.

Contact-points for closing another circuit may be placed at either end. They are shown attached to $a'$ $b'$.

From this description the operation is evident. A current being passed through the coils, as the armature is stationary, the coil itself moves to the magnet by attraction, with the least possible amount of friction.

It is evident that instead of the armature B being provided with uprights $b$ $b'$, it may be straight, the core of A being prolonged, and the parts $a$ $a'$ thereof being bent downwardly to the immediate vicinity of the ends of B. It is also evident that the parts $b$ $b'$, instead of being in different vertical planes, as shown, may be in the same vertical plane, their interior sides being beveled to afford a good attracting-surface parallel with the ends $a$ $a'$ of the core of A.

Having thus described my invention, what I claim as new, and desire to secure by Letters Patent, is—

The combination, with a fixed armature, plain or electro-magnetic, of an electro-magnetic coil, movably suspended above the same, substantially as herein shown and described.

PATRICK B. DELANY.

Witnesses:
  W. P. WESTERVELT,
  MAZE EDWARDS.